United States Patent
Patel et al.

(10) Patent No.: US 11,187,128 B2
(45) Date of Patent: Nov. 30, 2021

(54) AFTER-TREATMENT SYSTEM FOR REPOWER LOCOMOTIVES

(71) Applicant: Progress Rail Services Corporation, Albertville, AL (US)

(72) Inventors: Ajay Patel, Joliet, IL (US); Arun Kumar, Bangalore (IN)

(73) Assignee: Progress Rail Services Corporation, Albertville, AL (US)

( * ) Notice: Subject to any disclaimer, the term of this patent is extended or adjusted under 35 U.S.C. 154(b) by 0 days.

(21) Appl. No.: 16/813,215

(22) Filed: Mar. 9, 2020

(65) Prior Publication Data

US 2021/0277816 A1  Sep. 9, 2021

(51) Int. Cl.
| | |
|---|---|
| *F01N 3/20* | (2006.01) |
| *F01N 3/28* | (2006.01) |
| *F01N 13/18* | (2010.01) |
| *B61C 5/04* | (2006.01) |

(52) U.S. Cl.
CPC .............. *F01N 3/28* (2013.01); *B61C 5/04* (2013.01); *F01N 3/206* (2013.01); *F01N 3/208* (2013.01); *F01N 3/2066* (2013.01); *F01N 13/1816* (2013.01); *F01N 2610/02* (2013.01)

(58) Field of Classification Search
CPC ........ F01N 3/206; F01N 3/2066; F01N 3/208; F01N 3/28; F01N 13/1816; F01N 2610/02; B61C 5/04
See application file for complete search history.

(56) References Cited

U.S. PATENT DOCUMENTS

| | | | |
|---|---|---|---|
| 6,312,650 B1 * | 11/2001 | Frederiksen ....... | B01D 53/9431 422/180 |
| 8,220,253 B2 * | 7/2012 | Werni .................. | F01N 3/2066 60/301 |
| 8,752,370 B2 * | 6/2014 | Hittle ................... | F01N 13/017 60/324 |
| 9,995,198 B2 | 6/2018 | Sandou | |
| 10,202,884 B2 | 2/2019 | Plummer et al. | |
| 10,221,756 B2 | 3/2019 | Music et al. | |
| 2008/0283328 A1 * | 11/2008 | Askew ................ | F01N 13/1816 180/296 |
| 2010/0186394 A1 | 7/2010 | Harrison et al. | |

(Continued)

FOREIGN PATENT DOCUMENTS

| | | | |
|---|---|---|---|
| CN | 208138018 U | * | 11/2018 |
| WO | 2018173392 A1 | | 9/2018 |

*Primary Examiner* — Audrey B. Walter
(74) *Attorney, Agent, or Firm* — von Briesen & Roper, s.c.

(57) ABSTRACT

An SCR after-treatment system for a locomotive engine includes an enclosure defining an exhaust flow path from an inlet to an outlet, the inlet being flexibly connected to an exhaust outlet of the engine, an injector located in the inlet and configured to provide an aerosolized reductant into the exhaust flow path, a mixing tube extending from the inlet into the enclosure towards a back wall of the enclosure; a plurality of catalyst cells extending parallel to the mixing tube; the exhaust flow path traveling through the plurality of catalyst cells between the mixing tube and the outlet, and a side channel located between the mixing tube and the plurality of catalyst cells. The enclosure is configured to create low back pressure and an even distribution of the exhaust flow path across the plurality of catalyst cells.

20 Claims, 7 Drawing Sheets

(56) References Cited

U.S. PATENT DOCUMENTS

| | | | |
|---|---|---|---|
| 2011/0146236 A1* | 6/2011 | Sun | F01N 3/021 60/274 |
| 2012/0273648 A1 | 11/2012 | Maske et al. | |
| 2013/0098002 A1* | 4/2013 | Danckert | F01N 13/0093 60/282 |
| 2013/0125524 A1* | 5/2013 | Plummer | F01N 3/2066 60/39.5 |
| 2015/0037219 A1* | 2/2015 | Moran | F01N 13/0097 422/171 |
| 2015/0165378 A1* | 6/2015 | Boeshans | F01N 3/103 422/171 |
| 2016/0367937 A1* | 12/2016 | Lu | F01N 3/2066 |
| 2018/0100420 A1* | 4/2018 | Patel | F01N 3/2828 |

* cited by examiner

AFTER-TREATMENT SYSTEM FOR REPOWER LOCOMOTIVES

TECHNICAL FIELD

The present disclosure relates generally to locomotives and, more specifically, relates to aftertreatment systems for locomotive engines.

BACKGROUND

Locomotives are used extensively to transport large quantities of materials across the country. Locomotive engines must meet government regulations dictating exhaust emission limits. The most strenuous emission requirements are known as Tier 4, as promulgated by the Environmental Protection Agency. Some locomotive engines do not meet Tier 4 requirements without the use of an aftertreatment system. In particular, an aftertreatment system which reduces nitrogen oxide (NOx) emissions may be needed for some engines. A selective catalytic reaction (SCR) system is typically used for NOx reduction.

As a general method, SCR aftertreatment is common and well known. However, providing an aftertreatment system that has the capacity to handle the large exhaust volume created by a locomotive engine, while also fitting into the confined space available between the engine and the top of the engine car body, presents a challenge. Any such system must fit into the size constraints, be mounted flexibly to allow for thermal expansion and vibration, and effectively reduce emissions without negatively impacting engine performance.

The prior art has failed to adequately address this issue. U.S. Pat. No. 9,494,083 to Plummer et al. discloses a multi-passage aftertreatment system for locomotives. However, this system is complex and requires elaborate recirculation controls. There is a need for a simpler system.

SUMMARY OF THE DISCLOSURE

According to one aspect of the present disclosure, an after-treatment system for a locomotive engine is disclosed. The aftertreatment system includes an enclosure defining an exhaust flow path from an inlet to an outlet, the inlet being flexibly connected to an exhaust outlet of the engine, an injector located in the inlet and configured to provide an aerosolized reductant into the exhaust flow path, a mixing tube extending from the inlet into the enclosure towards a back wall of the enclosure; a plurality of catalyst cells extending parallel to the mixing tube; the exhaust flow path traveling through the plurality of catalyst cells between the mixing tube and the outlet, and a side channel located between the mixing tube and the plurality of catalyst cells. The enclosure is configured to create low back pressure and an even distribution of the exhaust flow path across the plurality of catalyst cells.

According to another aspect of the present disclosure, a locomotive is disclosed. The locomotive includes, a frame; an envelope supported by the frame; at least one set of drive wheels supporting the frame; an engine supported by the frame and providing power to the drive wheels; and an aftertreatment system supported by the frame and located between the engine and the external envelope. The after-treatment system includes an enclosure defining an exhaust flow path from an inlet to an outlet, the inlet being flexibly connected to an exhaust outlet of the engine, an injector located in the inlet and configured to provide an aerosolized reductant into the exhaust flow path, a mixing tube extending from the inlet into the enclosure towards a back wall of the enclosure; a plurality of catalyst cells extending parallel to the mixing tube; the exhaust flow path traveling through the catalyst cells between the mixing tube and the outlet, and a side channel located between the mixing tube and plurality of catalyst cells. The enclosure is configured to create low back pressure and an even distribution of the exhaust flow path across the plurality of catalyst cells.

According to yet another aspect of the present disclosure, a method of reducing nitrogen oxides in the exhaust of a locomotive engine is disclosed. The method includes providing an aftertreatment system, injecting an aerosolized reductant into the exhaust, mixing the reductant with the exhaust, and passing the mixture of reductant and exhaust over the plurality of catalyst cells such that nitrogen oxides in the exhaust decompose into diatomic nitrogen and water. The after-treatment system includes an enclosure defining an exhaust flow path from an inlet to an outlet, the inlet being flexibly connected to an exhaust outlet of the engine, an injector located in the inlet and configured to provide an aerosolized reductant into the exhaust flow path, a mixing tube extending from the inlet into the enclosure towards a back wall of the enclosure; a plurality of catalyst cells extending parallel to the mixing tube; the exhaust flow path traveling through the plurality of catalyst cells between the mixing tube and the outlet, and a side channel located between the mixing tube and the plurality of catalyst cells. The enclosure is configured to create low back pressure and an even distribution of the exhaust flow path across the plurality of catalyst cells.

These and other aspects and features of the present disclosure will be more readily understood after reading the following detailed description in conjunction with the accompanying drawings.

DETAILED DESCRIPTION

Figure 1:
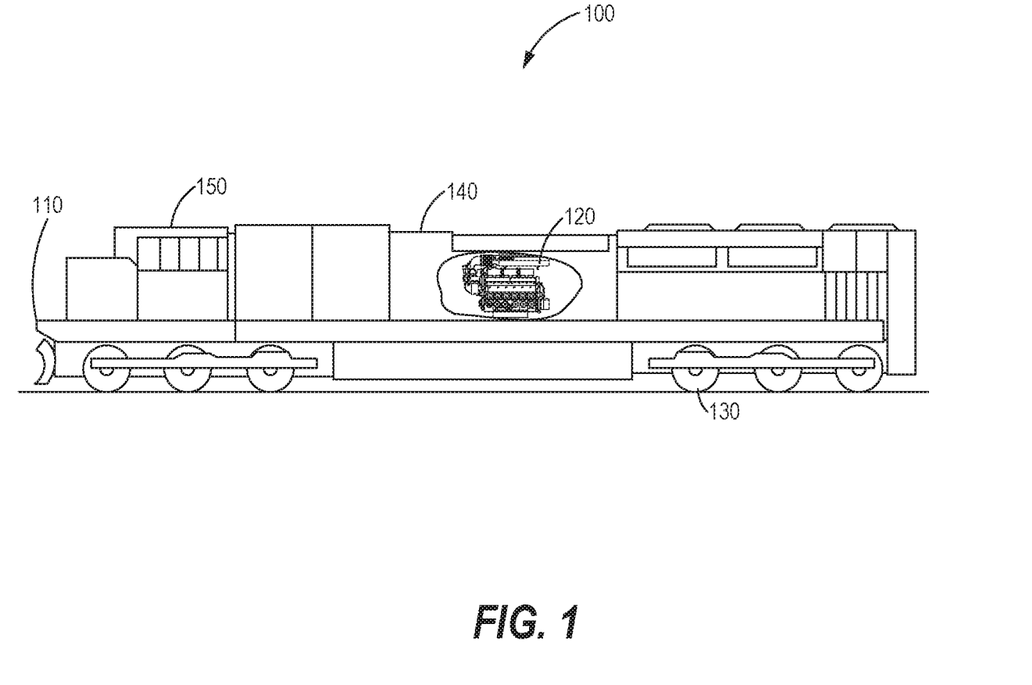
FIG. 1 is a schematic diagram of one embodiment of a locomotive according to the present disclosure.

Referring now to the drawings, and with specific reference to FIG. 1, a locomotive constructed in accordance with the present disclosure is generally referred to by reference numeral 100. A locomotive 100 is an engine car which provides motive power to the rest of a train. The locomotive 100 includes a base 110, an engine 120 supported by the base 100, at least one set of drive wheels 130 supporting the base 110 and driven by the engine 120, and an envelope 140 covering the base 110 and engine 120. The locomotive 100 typically also includes an operator cab 150.

The envelope is typically one of several standard sizes dictating height and width. In the present disclosure, the envelope meets the standard of Locomotive Clearance Diagram Plate C, shown in FIG. 2. A Plate C envelope has a maximum height 210 of 15 feet 6 inches and a maximum width 220 of 10 ft 8 inches. However, at longer car lengths, the top and bottom of the envelope must be chamfered to an inner width 230 of 7 feet, which limits the internal volume.

The engine 120 may be a two-stroke diesel engine. The engine 120 may be a repower engine. A repower engine is a new engine intended for use with an old locomotive. Locomotive engines must meet government regulations dictating exhaust emission limits. The most strenuous emission requirements are known as Tier 4. Some locomotive engines do not meet Tier 4 requirements without the use of an aftertreatment system. In particular, an aftertreatment system which reduces nitrogen oxide (NOx) emissions may be needed for some engines.

One common method of reducing NOx emissions is through a selective catalytic reaction (SCR). In this method, engine exhaust is mixed with a gaseous reactant such as ammonia or urea. The urea may be in the form of Diesel Exhaust Fluid which is a combination of de-ionized water and either 32.5% or 40% urea by weight. As the mixture passes over the catalyst, the NOx decomposes into $N_2$ and water. The catalyst may be a base metal such as vanadium, molybdenum, or tungsten. If urea is used as the reactant, it must thermally decompose into ammonia prior to reaching the catalyst.

Figure 2:
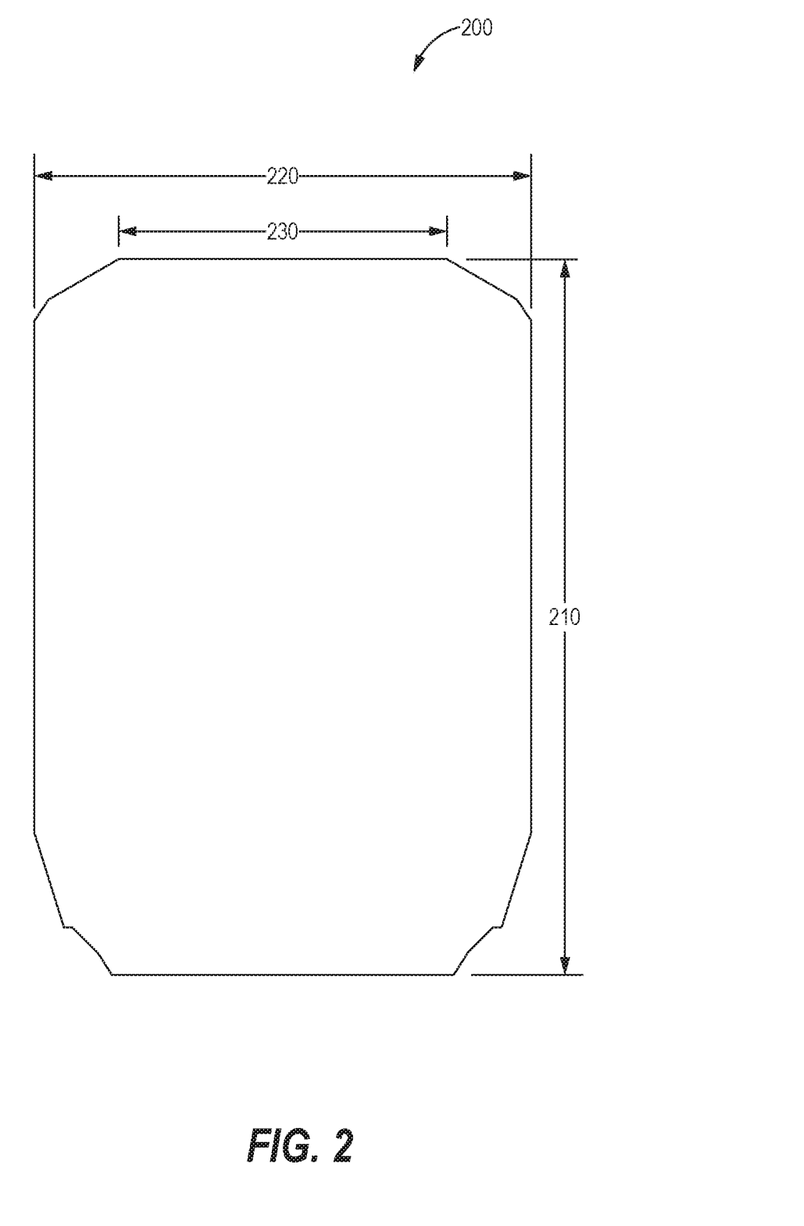
FIG. 2 is a Plate C Clearance diagram according to the Association of American Railroads and the present disclosure.

As a general method, SCR aftertreatment is common and well known. However, providing an aftertreatment system that has the capacity to handle the large exhaust volume created by a locomotive engine 120, while also fitting into the confined space available between the engine 120 and the Plate C envelope 200, presents a challenge. Any such system must a) fit into the size constraints, b) allow access to engine maintenance panels, c) be mounted flexibly to allow for thermal expansion and to respond the motion and vibration of a moving vehicle, d) effectively reduce emissions to the required levels, and e) not affect engine performance with excessive back pressure.

Figure 3:
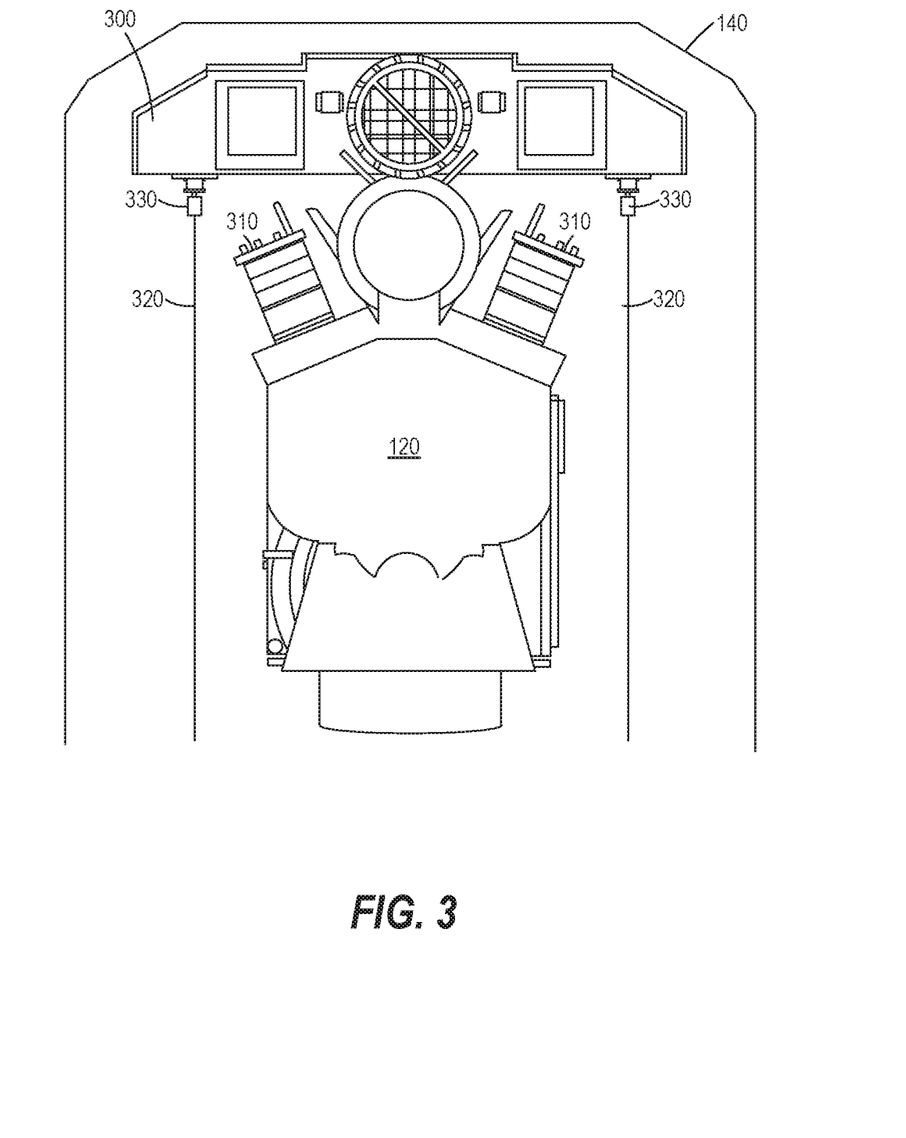
FIG. 3 is a schematic view of an engine and aftertreatment system within a Plate C envelope according to one aspect of the present disclosure.

As shown in FIG. 3, the aftertreatment system 300 is limited in height by the engine 120 below and the top of the envelope 140 above. Furthermore, the system 300 cannot extend down the sides of the engine 120 because that would prevent necessary access to the engine 120 through engine maintenance panels 310. In the illustrated embodiment, the aftertreatment system 300 has a maximum height of 23 inches.

In order to provide the required flexibility to prevent problems caused by thermal expansion, vibration, and movement, the aftertreatment system 300 may be mounted above the engine 120 on an engine hood structure 320 with a flexible connector 330. The flexible connector 330 may be a spring or other similar means. In one embodiment, the flexible connector 330 may be a Belleville stack. Furthermore, as shown in FIG. 4, the engine 120 has an exhaust outlet 410 which is flexibly connected to the aftertreatment system 300 through a flex joint 420.

Figure 4:
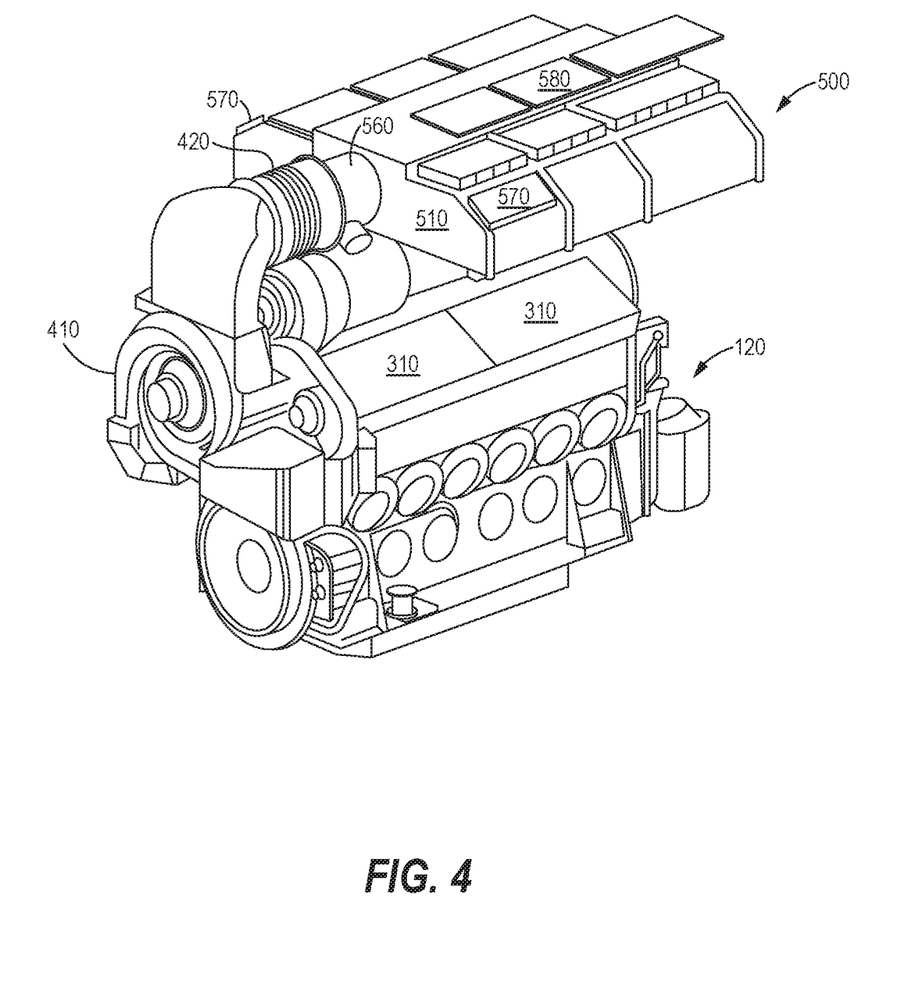
FIG. 4 is a perspective view of an engine and aftertreatment system according to one aspect of the present disclosure.
Figure 5:
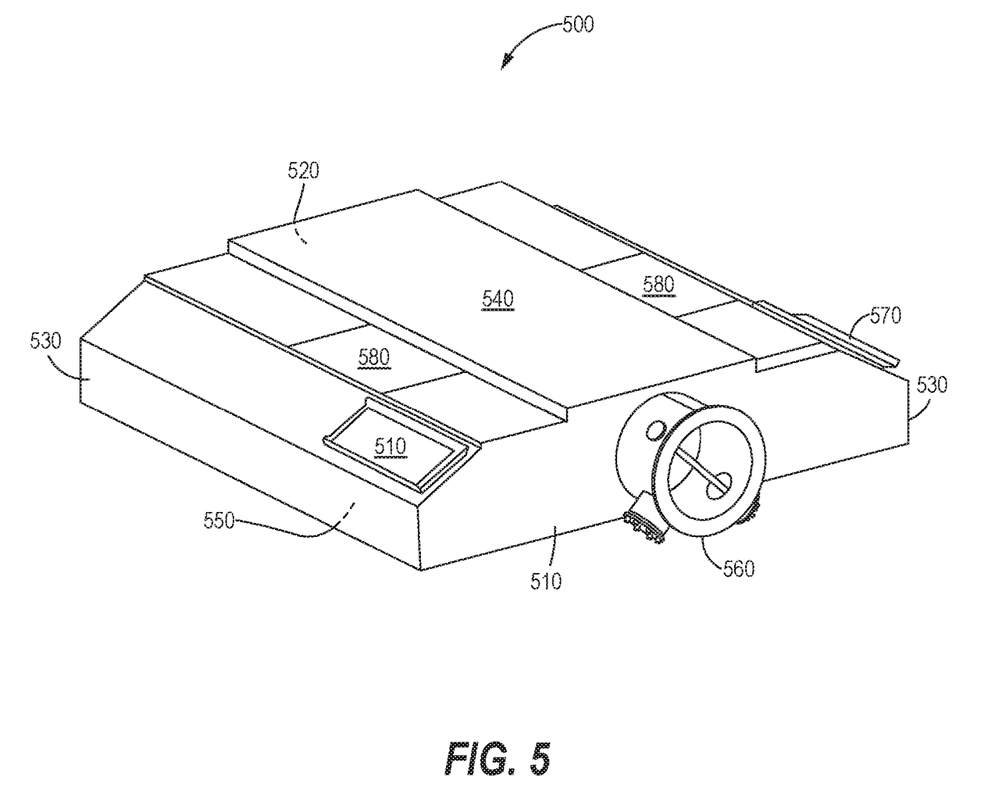
FIG. 5 is a perspective view of the enclosure of an aftertreatment system according to one aspect of the present disclosure.

The aftertreatment system 300 is contained within an enclosure 500, as shown in FIG. 4 and FIG. 5. The enclosure 500 has an inlet wall 510, a back wall 520 opposite the inlet wall 510, two side walls 530 connecting the inlet wall 510 and the back wall 520, an upper wall 540, and a lower wall 550. The combination of all the walls 510, 520, 530, 540, 55 forms a roughly rectangular interior space. An inlet 560 is located on the inlet wall 510. An outlet 570 is located on the upper wall 540 proximate to each of the side walls 530. The lower wall 550 may be substantially flat. The upper wall 540 may be chamfered as necessary to conform to Plate C envelope specifications. Access panels 580 may be located on the upper wall 580. In one embodiment, the enclosure 500 may have a height of 23.4 inches, a length of 105 inches, and a width of 105 inches. The inlet 560 may extend 15 inches from the inlet wall 510.

Figure 6:
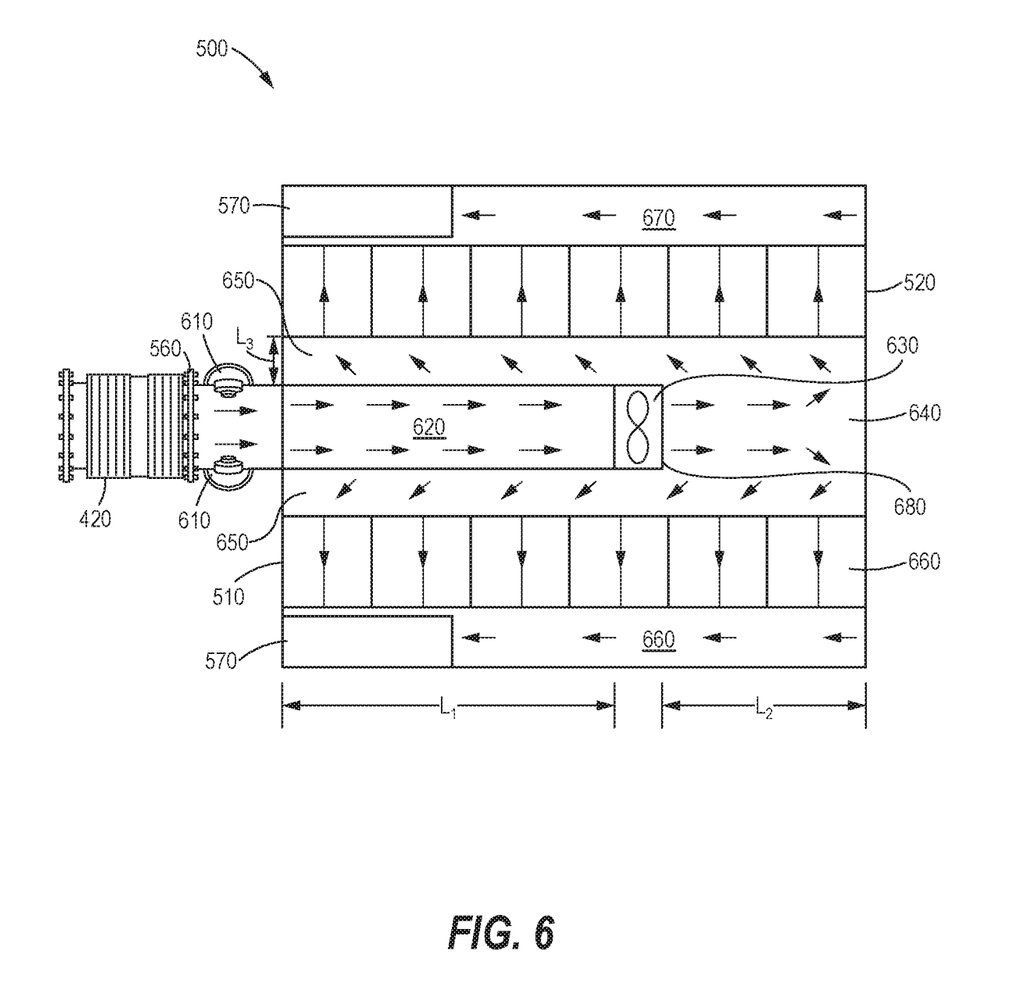
FIG. 6 is a schematic top view of the internal structure of an aftertreatment system according to one aspect of the present disclosure.

Depicted in FIG. 6, the internal structure of the aftertreatment structure 300 provides effective NOx emission reductions without affecting engine performance with excessive backpressure. The internal structure includes the inlet 560, at least one injector 610, a mixing tube 620, a mixer 630, a back chamber 640, side channels 650, catalyst cells 660, outlet channels 670 and outlets 570. The inlet 560 is located in the center of the inlet wall 510, connects the flex joint 420 with the rest of the aftertreatment system 300, and provides a downstream path for an exhaust flow from the engine 120. In one embodiment, the exhaust flow may be 18000 kilograms per hour.

The injector 610 is located in the inlet 560. In one embodiment, an injector 610 may be located on either side of the inlet 560. The injector 610 is configured to inject an aerosolized mixture of liquid urea and air into the exhaust flow path. In some embodiments, an alternative reductant such as anhydrous ammonia or aqueous ammonia may be used in place of urea. The urea may be provided from a urea storage tank located elsewhere in the locomotive. As the urea meet the hot exhaust, the heat causes the water in urea to evaporate and the urea to break down into gaseous ammonia.

The mixing tube 620 extends from the inlet 560 through the center of the enclosure 500 and has an end 680 located between a center point of the enclosure and the back wall 520. As the exhaust and injected urea travel down the mixing tube 620, the turbulence created by the injection mixes the two gases together. By the end 680 of the mixing tube 620, the gases are substantially mixed. Furthermore, a mixer 630 may be located at the end 680 of the mixing tube 620 to ensure complete mixing. In one embodiment, the mixer 630 may be a two stage mixer.

Between the end 680 of the mixing tube 620 and the back wall 520 is a back chamber 640. Along each side of the mixing tube 620 is a side channel 650. Exhaust flow travels from inside the mixing tube 620, through the mixer 630, into the back chamber 640, and then the exhaust flow is directed down the side channels 650 back towards the inlet wall 510. This allows for low back pressure and even flow across the catalyst cells 660.

The catalyst cells 660 are located in two lines running from the inlet wall 510 to the back wall 520 adjacent to the side channels 650. Each catalyst cell 660 holds a quantity of the catalyst. As the exhaust flow mixed with the ammonia (decomposed urea) flows over the catalyst, the NOx breaks down into diatomic nitrogen ($N_2$) and water ($H_2O$). In one embodiment, the total volume of catalyst may be 700 liters and the catalyst may be vanadium.

Between the catalyst cells 660 and the side walls 530 of the enclosure 500, outlet channels 670 allow the treated exhaust to travel to the outlets 570. As shown in the illustrated embodiment, the outlets 570 may located on the upper wall 540 of the enclosure 500 at the corners of the inlet wall 510 and the side walls 530.

In order to ensure effective emission reduction without affecting engine performance, it is critical that the exhaust flow across each catalyst cell 660 be approximately equal and the back pressure be low. To achieve this, several critical dimensions must be correctly configured, specifically the length of the mixing tube 620 (L1), the length of the back chamber 640 (L2), and the width of the side channels 650 (L3). In one embodiment, the length of the mixing tube L1 is 60 inches, the length of the back chamber L2 is 38 inches, and the width of the side channel L3 is 8.6 inches. Of course, other configurations may be designed based on exhaust flow, total size limitations, catalyst type, and emission limits.

INDUSTRIAL APPLICABILITY

In operation, the aftertreatment system 300 of the present disclosure would be useful in a variety of industrial applications, such as, but not limited to, any application with restricted available space and strict NOx emission requirements. Such applications may include motor vehicles, locomotives, and stationary diesel engines as well as non-engine sources of NOx such as power plants, boilers, and other industrial activities.

Figure 7:
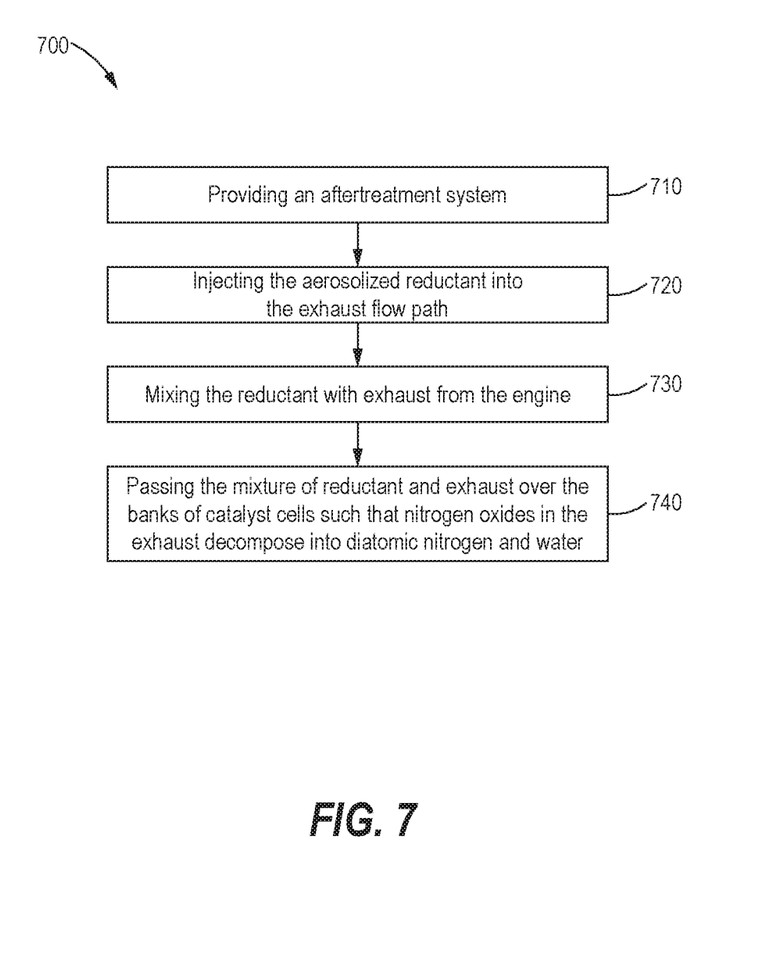
FIG. 7 is a flow chart representation of a method of reducing nitrogen oxides in the exhaust of a locomotive engine according to one aspect of the present disclosure.

The disclosed aftertreatment system 300 reduces emissions according to the following method 700, described in FIG. 7. The first step, as shown in Block 710, is providing an aftertreatment system. The after-treatment system includes an enclosure defining an exhaust flow path from an inlet to at least one outlet, the inlet being flexibly connected to an exhaust outlet of the engine, at least one injector located in the inlet and configured to provide an aerosolized reductant into exhaust flow path, a mixing tube extending from the inlet into the enclosure towards a back wall of the enclosure; a plurality of catalyst cells extending parallel to the mixing tube; the exhaust flow path traveling through the catalyst cells between the mixing tube and the outlet, and at least one side channel located between the mixing tube and the plurality of catalyst cells. The enclosure is configured to create low back pressure and an even distribution of the exhaust flow path across the plurality of catalyst cells.

Next, as shown in Block 720, the aerosolized reductant is injected into the exhaust flow path. In one embodiment, the reductant may be urea, but alternatives such as ammonia may be used. After injecting, the reductant is mixed with the exhaust from the engine in the mixing tube, as shown in Block 730. Finally, the mixture is passed over the banks of catalyst cells. As the mixture passes the catalyst contained in the cells, nitrogen oxides in the exhaust decompose into diatomic nitrogen and water.

While the preceding text sets forth a detailed description of numerous different embodiments, is should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. An after-treatment system for a locomotive engine, comprising:
   an enclosure defining an exhaust flow path from an inlet to an outlet, the inlet being flexibly connected to an exhaust outlet of the engine;
   an injector located in the inlet and configured to provide an aerosolized reductant into the exhaust flow path;
   a mixing tube extending from the inlet into the enclosure towards a back wall of the enclosure, the mixing tube having an end opposite the inlet located between a center point of the enclosure and the back wall;
   a back chamber extending from the end of the mixing tube to the back wall; and
   a plurality of catalyst cells extending from an inlet wall of the enclosure to the back wall parallel to the mixing tube, the exhaust flow path traveling from the inlet through the mixing tube into the back chamber, and from the back chamber the exhaust flow path directed down a side channel towards the inlet wall before traveling through the catalyst cells and the outlet, the enclosure being configured to create low back pressure and an even distribution of the exhaust flow path across the plurality of catalyst cells, and the side channel located between the mixing tube and the back chamber, and the plurality of catalyst cells.

2. The after-treatment system of claim 1, wherein the low back pressure and even distribution are created by controlling key dimensions, the key dimensions including:
   a length of the mixing tube,
   a distance from the end of the mixing tube to the back wall of the enclosure, and
   a width of the side channel from the plurality catalyst cells to the mixing tube.

3. The after-treatment system of claim 2, wherein the length of the mixing tube is 60 inches, the distance from the end of the mixing tube to the back wall of the enclosure is 38 inches, and the width of the side channel is 8.6 inches.

4. The after-treatment system of claim 1, further comprising a mixer located at the end of the mixing tube.

5. The after-treatment system of claim 4, wherein the mixer is a two-stage mixer.

6. The after-treatment system of claim 1, wherein the plurality of catalyst cells contain vanadium.

7. The after-treatment system of claim 1, wherein the enclosure is configured to fit between the engine and an envelope meeting Plate C clearance standards.

8. A locomotive, comprising:
   a frame;
   an envelope supported by the frame;
   at least one set of drive wheels supporting the frame;
   an engine supported by the frame and providing power to the drive wheels; and
   an aftertreatment system supported by the frame and located between the engine and the envelope, the aftertreatment system having:
   an enclosure defining an exhaust flow path from an inlet to an outlet, the inlet being flexibly connected to an exhaust outlet of the engine;
   an injector located in the inlet and configured to provide an aerosolized reductant into the exhaust flow path;
   a mixing tube extending from the inlet into the enclosure towards a back wall of the enclosure, the mixing tube having an end opposite the inlet located between a center point of the enclosure and the back wall;
   a back chamber extending from the end of the mixing tube to the back wall; and
   a plurality of catalyst cells extending from an inlet wall of the enclosure to the back wall parallel to the mixing tube, the exhaust flow path traveling from the inlet through the mixing tube into the back chamber, and from the back chamber the exhaust flow path directed down a side channel towards the inlet wall before traveling through the catalyst cells and the outlet, the enclosure being configured to create low back pressure and an even distribution of the exhaust flow path across the plurality of catalyst cells.

9. The locomotive of claim 8, wherein the low back pressure and even distribution are created by controlling key dimensions, the key dimensions including:
   a length of the mixing tube,
   a distance from the end of the mixing tube to the back wall of the enclosure, and
   a width of the side channel from the plurality of catalyst cells to the mixing tube.

10. The locomotive of claim 9, wherein the length of the mixing tube is 60 inches, the distance from the end of the mixing tube to the back wall of the enclosure is 38 inches, and the width of the side channel is 8.6 inches.

11. The locomotive of claim 8, further comprising a mixer located at the end of the mixing tube.

12. The locomotive of claim 11, wherein the mixer is a two-stage mixer.

13. The locomotive of claim 8, wherein the plurality of catalyst cells contain vanadium.

14. The locomotive of claim 8, wherein the envelope meets Plate C clearance requirements.

15. A method of reducing nitrogen oxides in an exhaust of a locomotive engine, comprising:
   providing an aftertreatment system, the aftertreatment system having an enclosure defining an exhaust flow path from an inlet to an outlet, the inlet being flexibly connected to an exhaust outlet of the engine, an injector located in the inlet and configured to provide an aerosolized reductant into the exhaust flow path, a mixing tube extending from the inlet into the enclosure towards an end opposite of the inlet located between a center point of the enclosure and a back wall of the enclosure, a back chamber extending from the end of the mixing tube to the back wall, a plurality of catalyst cells extending from an inlet wall of the enclosure to the back wall parallel to the mixing tube, the exhaust flow path traveling from the inlet through the mixing tube into the back chamber, and from the back chamber the exhaust flow path directed down a side channel towards the inlet wall before traveling through the plurality of catalyst cells and the outlet, the enclosure being configured to create low back pressure and an even distribution of the exhaust flow path across the plurality of catalyst cells, and the side channel located between the mixing tube and the back chamber, and the plurality of catalyst cells;
   injecting the aerosolized reductant into the exhaust flow path;
   mixing the reductant with the exhaust from the engine in the mixing tube; and
   passing the mixture of reductant and the exhaust over the plurality catalyst cells such that nitrogen oxides in the exhaust decompose into diatomic nitrogen and water.

16. The method of claim 15, wherein the low back pressure and even distribution are created by controlling key dimensions, the key dimensions including:
   a length of the mixing tube,
   a distance from the end of the mixing tube to the back wall of the enclosure, and
   a width of the side channel from the plurality of catalyst cells to the mixing tube.

17. The method of claim 16, wherein the length of the mixing tube is 60 inches, the distance from the end of the mixing tube to the back wall of the enclosure is 38 inches, and the width of the side channel is 8.6 inches.

18. The method of claim 15, further comprising a mixer located at the end of the mixing tube.

19. The method of claim 15, wherein the plurality of catalyst cells contain vanadium.

20. The method of claim 15, wherein the reductant is urea.

* * * * *